July 10, 1962 H. WELLSCH 3,043,348
APPARATUS FOR INTRODUCING LIQUID INTO
AND REMOVING FROM A PNEUMATIC TUBE
Filed Sept. 22, 1958 2 Sheets-Sheet 1

INVENTOR.
Henry Wellsch
BY Olson & Trexler
attys

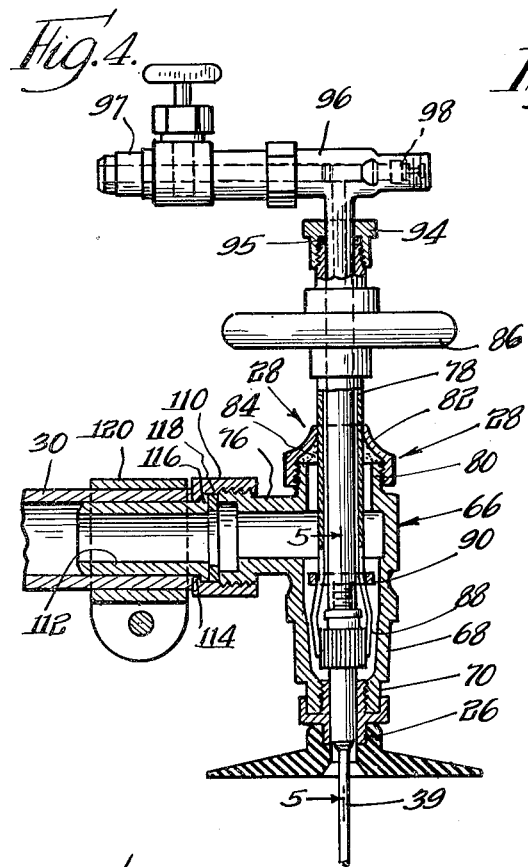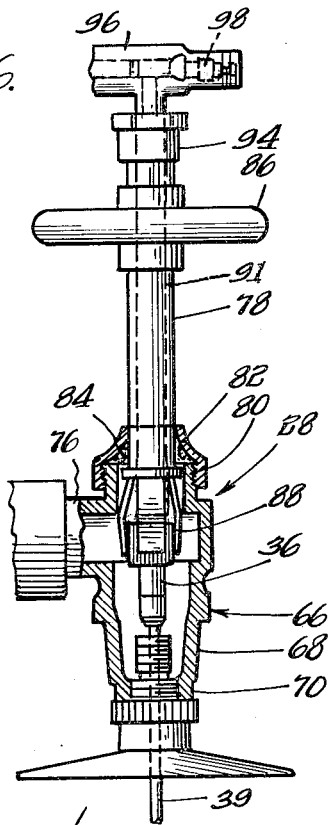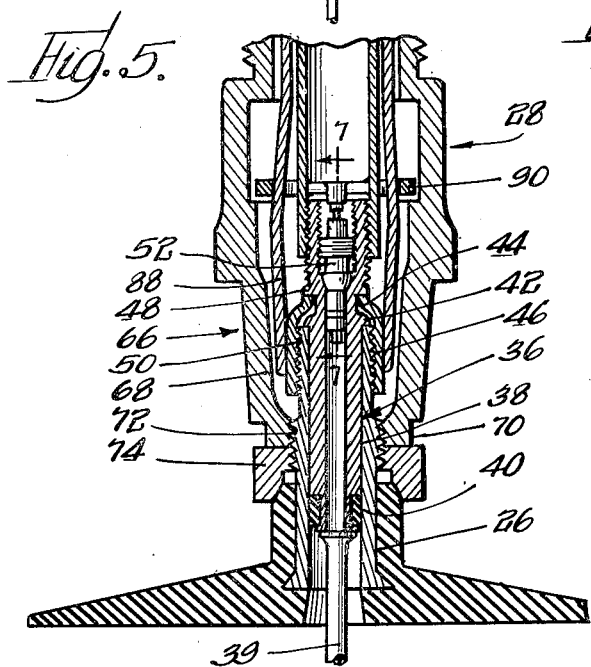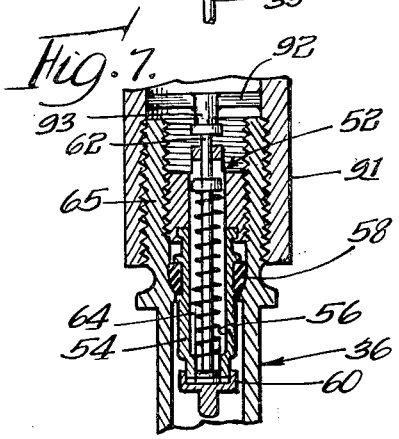

United States Patent Office
3,043,348
Patented July 10, 1962

3,043,348
APPARATUS FOR INTRODUCING LIQUID INTO AND REMOVING FROM A PNEUMATIC TUBE
Henry Wellsch, Swift Current, Saskatchewan, Canada
Filed Sept. 22, 1958, Ser. No. 762,611
4 Claims. (Cl. 141—38)

The present invention relates to a novel apparatus for filling a tractor tire or the like with liquid under pressure.

As is well known, pneumatic tires of tractors or the like are often filled with liquid or water in order to increase the weight of the vehicle or tractor and thereby improve its traction and stability. In the past, it has been the customary practice to use a liquid pump for filling such tires with water or the like. One difficulty which arises when such a pump is used is that the pressure within the tire may be increased to such an extent that the tire is injured without the operator knowing it. Furthermore, in climates where there is danger of frost or freezing temperatures, it is necessary to add chemical anti-freeze to the water in the tire and it has been found that such chemicals damage the liquid pumps heretofore used and makes it necessary to replace such pumps at fairly frequent intervals which, for example, are often within one year. Considerable inconvenience has also been encountered when it is desired to drain the liquid from the tires since, in accordance with prior practices, this is accomplished by opening the tire valve and allowing the liquid to flow relatively slowly therefrom. This procedure is relatively time-consuming and, in addition, the liquid having anti-freeze chemicals therein may be lost.

An important object of the present invention is to provide novel means for filling pneumatic tires or the like or other containers with liquid under pressure in a manner which eliminates the need for pumps of the type heretofore used whereby the cost and inconvenience of replacing such pumps are eliminated.

Another object of the present invention is to provide a novel apparatus for filling a pneumatic tire or the like or other container with liquid under pressure, which apparatus is constructed so as substantially to eliminate any possibility of creating a pressure which is sufficiently high to cause injury to the apparatus or the tire.

Still another object of the present invention is to provide a novel apparatus of the above described type which may also be used to remove the liquid from the tire or other container rapidly and without wasting the liquid.

A more specific object of the present invention is to provide a novel valve structure for an apparatus of the above described type, which valve structure may be readily connected to a tube valve stem of a tire for establishing communication between the tube valve stem and a liquid supply source, and which valve structure may be removed from the tube or tire valve stem without permitting the fluid under pressure within the tire to escape.

Other and more specific objects of the present invention will become apparent from the following description and the accompanying drawings wherein:

FIG. 4 is an enlarged view partially broken away of a valve assembly of the apparatus adapted to be connected to the tire or tube valve stem;

FIG. 5 is a further enlarged fragmentary sectional view taken along line 5—5 in FIG. 4;

FIG. 6 is a fragmentary partial sectional view similar to FIG. 4 but showing the check valve unit removed from the tire valve stem; and FIG. 7 is an enlarged fragmentary sectional view taken along line 7—7 in FIG. 5.

Figure 1:
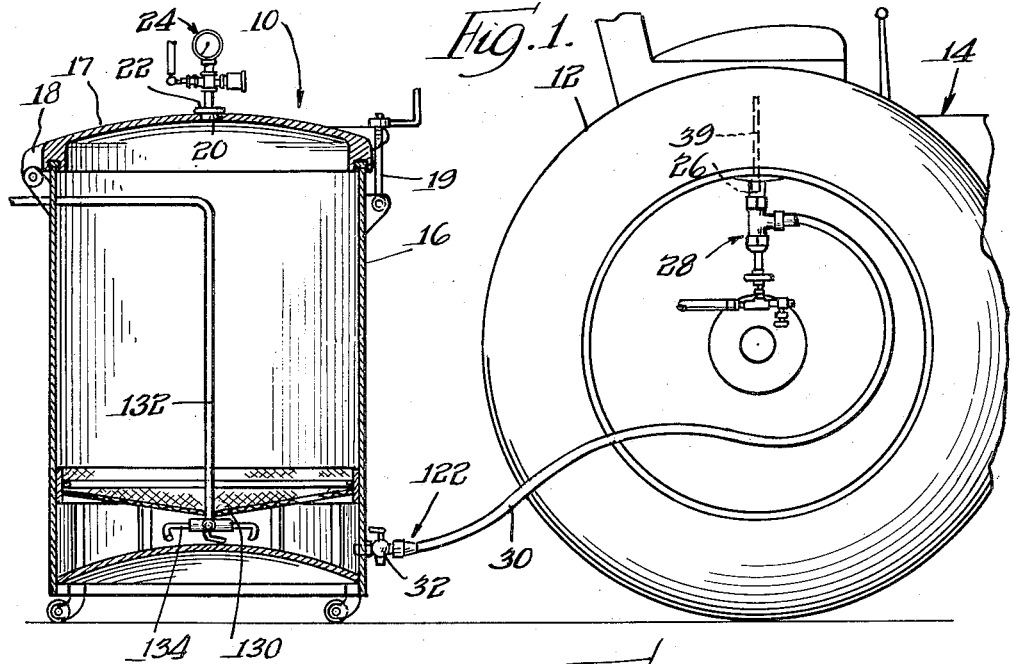
FIG. 1 is an elevational view showing an apparatus incorporating the features of the present invention connected with a tractor tire for filling the tire with a liquid.

Referring now more specifically to the drawings wherein like parts are designated by the same numerals throughout the various figures, an apparatus 10 is shown by which liquid such as water may be introduced into or removed from a pneumatic tire 12 of a tractor or other vehicle 14. The apparatus 10 comprises a pressure tank and liquid reservoir 16 which is preferably large enough to contain sufficient liquid to substantially fill the tire 12. A top or seal cover 17 is hingedly connected to the pressure tank at 18 and is also removably held thereon by clamps 19. The cover 17 of the pressure tank is provided with an aperture 20 which is normally closed and sealed by a plug 22. Upon removal of the plug 22, the tank may be filled with liquid through the opening 20. Thus, a tank of any desired size may be used since it can be repeatedly refilled with liquid. An assembly 24 is connected to the plug 22, through which assembly air under pressure may be introduced into the tank for forcing the liquid into the tire in the manner described fully hereinbelow. The tank 16 is connected with a tire or tube valve stem 26 by means including a valve structure 28 to be described in detail below, a length of flexible hose 30 and a shutoff valve 32 secured to a lower portion of the tank 16. The shutoff valve 32 may be of known construction and, therefore, need not be described in detail.

Referring particularly to FIGS. 4 through 7, it is seen that there is provided a tubular valve body or sleeve 36 having a smooth lower end portion 38 adapted snugly and slidably to fit within the valve stem 26. A restricted tube 39 forms a continuation of the end portion 38 projecting into the interior of the tire 12. A seal ring 40 is provided at the inner end of the tubular body 36 for preventing the escape of fluid between the tubular body and the valve stem. An annular shoulder 42 is provided on the tubular body for limiting axial movement thereof into the valve stem 26. An end portion 44 of an internally threaded coupling member 46 is crimped over the annular flange 42 and beneath a second annular flange 48 on the tubular member 36 so that the tubular member and the coupling member are connected for relative rotative movement and are restrained against relative axial movement. The internally threaded coupling member 46 is adapted to be turned onto an externally threaded portion 50 of the valve stem 26 for removably securing the tubular body 36 in assembled relationship with the valve stem 26.

Disposed within an outer end portion of the bore of the tubular body 36 is a check valve unit 52 shown in FIGS. 5 and 7. No novelty is claimed herein for the unit 52 per se, and, therefore, it suffices to state that this unit includes an elongated body means 54 providing a central passageway 56 bypassing a seal 58 between the unit and the tubular body 36, which passageway is normally closed by a valve member 60 carried at the inner end of an elongated pin 62 and yieldably biased against the inner end of the body 54 by a spring 64. It will be appreciated that the valve unit 52 will normally prevent fluid under pressure from escaping from the tire. Thus, the remainder of the valve assembly 28 which is described below may be removed from the tire valve stem 26, if desired, without any loss of fluid pressure.

The optionally removable portion of the valve assembly 28 comprises a relatively large hollow valve body 66 having a portion 68 adapted to be applied over the tubular body 36 and the valve stem 26, which portion has an internally threaded terminal section 70 adapted to be rotated onto an enlarged externally threaded section 72 of the stem 26 and jammed against a nut 74 previously applied to the valve stem 26. The body 66 is also provided with a laterally extending externally threaded nipple 76 to which the hose or flexible conduit 30 may be connected in the manner described below. A tubular actuating stem 78 extends through an externally threaded end portion 80 of the body 66 opposite from and in axial alignment with the body portion 68, which actuating stem is rotatably and axially slidably confined by a member 82 threaded onto the body portion 80. An annular member 84 of suitable packing material is provided for preventing fluid from leaking between the stem 78 and the member 82. An actuating handle 86 is pressed onto or otherwise secured to the stem 78 near the outer end thereof.

The inner end of the tubular stem 78 is split axially so as to provide a plurality of resilient fingers 88. In the embodiment shown, the tubular actuating stem is provided with four substantially identical finger portions 88 which initially flare outwardly and terminate in converging end portions adapted to pass over and grip the coupling member 46. Preferably, the outer surface of the coupling member 46 is knurled or provided with axially extending ribs as indicated in FIGS. 4 and 6 and a locking washer 90 is forced onto the flaring portions of the resilient fingers in order to insure a connection between the fingers and the coupling member 46 which will enable the coupling member to be turned with the actuating stem. When the elements are in the position shown in FIG. 4 and it is desired to fill the tire with fluid under pressure, the fluid can be forced past the check valve unit 52 and into the tire. However, when such filling is to be accomplished, the tubular valve body 36 is preferably withdrawn from the valve stem 26 so as to leave the stem 26 unobstructed and thereby to permit more rapid filling of the tire. This is accomplished by turning the actuating handle 86 and actuating stem 78 in a direction so that the coupling member 46 which turns with the actuating stem is unthreaded from the valve stem 26. When the coupling member 46 has been disconnected from the valve stem 26, the actuating handle 86 is pulled axially outwardly so that the tubular body member 36 is shifted axially from the valve stem 26 to the position shown in FIG. 6. After filling of the tire has been completed, the actuating stem is shifted axially inwardly until the coupling member 46 engages the end of the valve stem 26 whereupon the actuating handle and stem are rotated so as to turn the coupling member 46 onto the valve stem 26 so that the check valve unit 52 will prevent the fluid under pressure from leaking from the tire.

A hollow connecting tube 91 extends within the tubular stem 78 short of the fingers 88 and projects upwardly therefrom. At its inner end, the tube 91 is threaded interiorly and may be threaded onto the uppermost exteriorly threaded portion 65 of the valve 36 by appropriate rotation of the tube 91 when the valve unit 52 is held by the fingers 88. Further, at its inner end, the tube 91 is provided with an inner cross piece 92 having a central downwardly directed projection 93 engaging the pin 62 of the valve unit 52 to hold the latter open when the tube 91 is threaded into the valve 36. The air in the tire escapes through the now open valve 52 and the tube 91.

The upper end of the stem 78 is externally threaded to receive a nut 94 serving to force packing 95 against the hollow tube 91 to seal the upper end of the stem 78. The upper end of the tube 71 communicates with another tube 96 provided at one end with a shutoff valve 97 and at the other end with a check valve 98 similar to the valve 52. The tube 96 and the valve 97 when open, permit escape of air when the tire is being filled with liquid.

The assembly 24 comprises a short pipe section 100 threaded through and sealed to the plug or cap 22 of the pressure container. A four-way cross connection 102 has one of its parts connected to the upper end of the pipe section 100. Another portion of this cross connection has mounted therein a check valve unit identical to the valve unit 52, so that air under pressure may be introduced into the pressure tank 16 by any suitable means such as a conventional air discharge head connected to a source of air under pressure by a flexible hose 104. An air pressure gauge 106 is connected with a third part of the connector 102 so as to enable an operator constantly to observe the pressure within the system and, therefore, the pressure which is being introduced within the tire so as to minimize any possibility of injury to the tire. Furthermore, injury to the tire as a result of undue pressure is precluded by connecting a pressure relief valve 108 to the last port of the connector.

The flexible hose or conduit 30 may be formed from any suitable material such as plastic, rubber or synthetic rubber materials. Preferably, the flexible hose is formed from a material which will not be damaged by anti-freeze chemicals or the like and the liquid to be introduced into the tire. One end of the hose is provided with coupling means adapted to be connected with the threaded nipple 76 of the valve body 66 as shown best in FIG. 4. In the embodiment illustrated, this coupling means comprises an internally threaded member 110 adapted to be threaded onto the nipple 76, which member 110 is rotatably connected with a tube 112 extending within the hose 30 by interengaging flanges 114 and 116 of the member 110 and tube 112, respectively. A sealing washer 118 seats against the flange 116 for preventing the coupling means from leaking, and a hose clamp 120 is provided for securing the tube 112 within the hose. Similar coupling means generally designated by the numeral 122 is provided at the opposite end of the hose 30 for connecting the hose to an inlet nipple of the pressure tank valve 32.

In accordance with the present invention a tire or any other receptacle may be filled with liquid under pressure by utilizing the apparatus described above in the following manner. First, of course, the valve assembly 28 is applied to the tire valve stem, the flexible hose is connected between the valve assembly 28 and the valve 32 and the pressure tank 16 is at least partially filled with liquid. Then the actuating handle 86 of the valve assembly 28 is manipulated in the manner described above to withdraw the tubular valve member 36 from the valve stem 26. The tube 91 is secured onto the valve 36. In addition, the shutoff valves 32 and 97 are turned so that they are opened. Then air under pressure is introduced through the hose 104, connector 102 and pipe 100 into the pressure tank 16 so that the pressure forces the liquid from the tank up through the hose 30 and valve assembly 28 and into the tire. The air in the tire escapes through the now open valve 52, the tube 91, the tube 96 and the open valve 97. When the tire has been filled the desired amount and to the desired pressure as indicated by the pressure gauge 106, the connector 102 is disconnected from the source of air under pressure and the shutoff valve 32 is closed. Then the actuating handle 86 of the valve assembly 28 is manipulated in the manner described above to reassemble the tubular member 36 with the tire valve stem 26. The tube 91 is unscrewed from the valve 36. Then the hose is disconnected from the valve assembly 28 and tractor is ready for operation. If desired, the body member 66 and actuating stem of the valve assembly 28 may be removed from the tire stem 26 to prevent injury thereto during operation of the tractor. This may be accomplished easily by pulling the actuating stem axially outwardly without turning it so as to loosen the coupling member 46 until the flexible fingers 96 are disengaged from the coupling member. Then the body member 66 is unthreaded from the stem 26.

Figure 2:
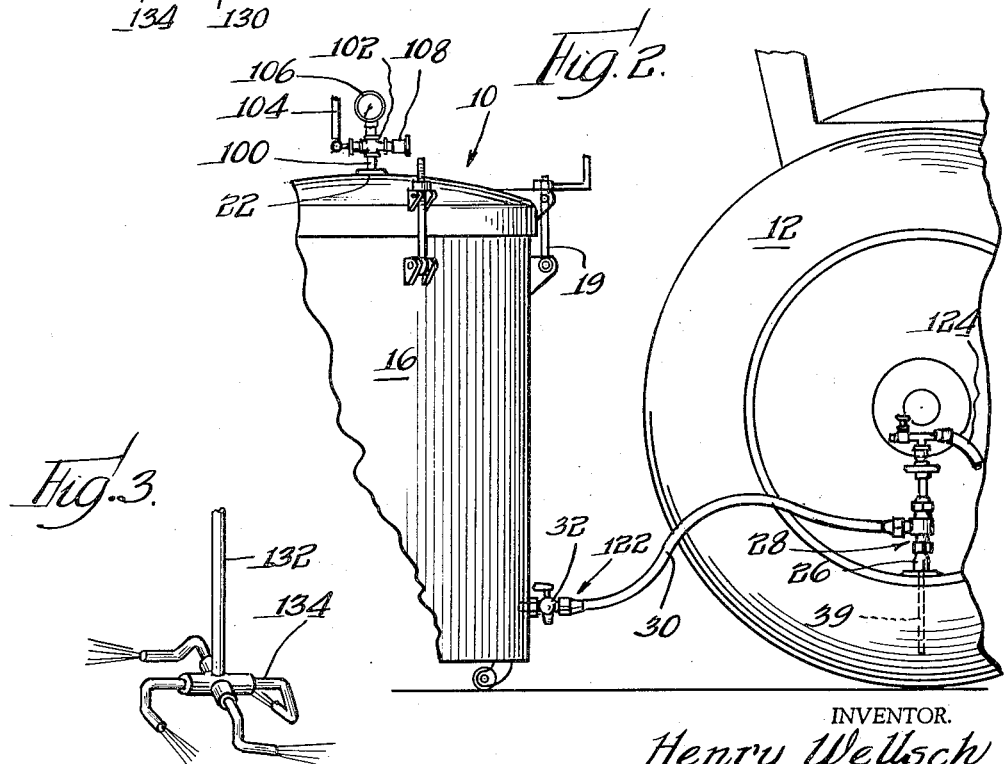
FIG. 2 is a fragmentary elevational view showing the apparatus and tire in condition for removing the liquid from the tire.
Figure 3:
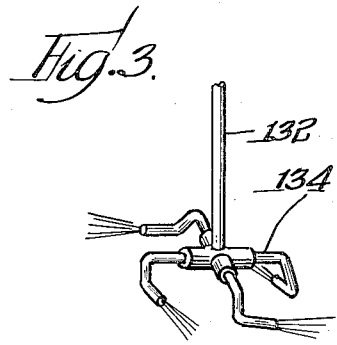
FIG. 3 is a fragmentary perspective view of a stirrer or agitator forming part of the apparatus of FIG. 1.

When it is desired to empty the liquid from the tractor tire, the tire is turned so that the valve stem 26 will be at the lowermost position as shown in FIG. 2. The flexible hose 30 is, of course, connected with the valve assembly 28 on the valve stem 26 and the pressure within the tank 16 is released. Then the shutoff valve 32 is opened and the actuating handle 86 of the valve assembly 28 is manipulated in the manner described above to remove the tubular valve member 36 from the valve stem 26. Then air under pressure is introduced into the tire by connecting a hose 124 attached to the valve 98 in the pipe 96 with a source of air under pressure (not shown). The air introduced into the tire through the hose 124 forces the liquid in the tire through the valve body 66 and the hose 30 back into the tank 16. When the tire has been filled with air, the valve 36 is replaced in the valve stem 26, the tube 91 is unscrewed from the valve 36 and the hose 124 disconnected from the tube 96. If desired, the valve structure 28 may then be disconnected from the valve stem 26.

Attention is directed to the function of the tube 91, the tube 96, the shutoff valve 97 and the check valve 98. When the valve 28 is removed from the valve stem 26, the valve unit 52 is held open by the projection 93, and liquid may flow through the valve body 66 and the hose 30 into or out of the tire 12. When the tire is being filled with liquid, air in the tire can readily escape through the tube 39 (which projects into the interior of the tire), the valve unit 52 (which is held open), the tube 91, the tube 96 and the then open shutoff valve 97. When liquid is being displaced by air from the tire, then the air enters the tire through the valve 98, the tube 96, the tube 91, the valve unit 52 and the tube 39, and the air which has entered the tire is kept from escaping by the valve 98 after the air hose and/or air pressure no longer are applied to the valve 97 until the tube 91 has been disconnected from the valve 36 and the latter has been replaced in the valve stem 26 so that the valve unit 52 can take over the function of preventing escape of air from the tire.

From the above description it is seen that the present invention has provided a novel system whereby liquid may be rapidly and easily introduced into a tire or the like in a manner so that the pressure within the tire may be constantly determined and accurately controlled. It is also seen that the apparatus of the present invention eliminates the need for the type of pump heretofore used for filling tires and subject to rapid deterioration when contacted by chemical anti-freezes or the like. It will further be appreciated that with the apparatus of the present invention the liquid may be easily and rapidly emptied from the tire whenever desired.

The present invention also provides means for quickly dissolving any desired solid material (for instance, calcium chloride) in the water in the container 16. For this purpose, a screen 130 sloping toward the center of the container spans the container near but spaced from the container bottom. An air conduit 132 extends centrally through the container for the discharge of air under pressure into and through hollow bent reactor arms 134 mounted rotatably at the end of the tube 132 just below the screen 130. Air bubbles rising from the orifices at the ends of the arms rise through the screen 132 and agitate the calcium chloride or other solid disposed on the screen 132. The rotation of the reaction spider with its arms 134 also agitates the liquid below the screen 130. By the action of the air bubbles and the arms 134, any soluble solid material disposed on the screen 130 may be quickly dissolved.

While the preferred embodiment of the present invention has been shown and described herein, it is obvious that many structural details may be changed without departing from the spirit and scope of the appended claims.

The invention is claimed as follows:

1. Means for filling a pneumatic tire with liquid under pressure and removing liquid from the tire, comprising, in combination, a tire valve stem defining a bore extending thereinto from the outer end thereof, a valve sleeve shaped and dimensioned diametrically to fit normally into said valve stem bore from the outer end thereof, the transverse outer dimensions of said sleeve being substantially equal to the corresponding transverse dimensions of said bore, said valve sleeve defining an axial bore therethrough, a valve mounted on said sleeve in biased blocking relation to said bore therein, a tubular extension on the inner end of said sleeve communicating with said bore therein and extending inwardly therefrom, said tubular extension having an external diameter substantially less than the internal diameter of said stem bore, retaining means normally securing said sleeve within said stem bore, a hollow body having connecting means thereon for detachably connecting the body to said valve stem, means forming a fluid supply connection to the interior of said body, a retractable actuating stem extending into said body toward said valve stem and including on the inner end thereof means for engaging said retaining means to release said sleeve for retraction thereof with the valve outwardly of said stem bore into said body with said tubular extension defining with said valve stem an annular liquid path, a retractable connecting tube extending through said actuating stem and having means on the inner end thereof adapted to connect with said sleeve to communicate with said bore therethrough and including means for shifting said valve to open position, and fluid flow control means on the outer end of said tube.

2. A pneumatic tire filling and draining attachment for use in introducing liquid or air through a valve stem into a pneumatic tire under pressure and for removing liquid or air from a pneumatic tire and comprising, in combination, a hollow body having means for connecting the same to the valve stem, means on said body forming a liquid supply connection, a valve sleeve carrying a check valve and adapted for mounting snugly and slidably within the valve stem and including a tubular extension projecting inwardly of the tire and of a diameter less than the diameter of the valve stem to provide therewith an annular liquid passage when the valve sleeve is removed from the valve stem, retaining means connecting the assembly of said valve sleeve and valve with said valve stem, a hollow actuating stem slidably and rotatably mounted in said body and having means engageable with the retaining means for separating the sleeve and valve assembly from the valve stem and shifting the assembly to a position with the valve sleeve removed from the valve stem and the tubular extension providing the annular chamber with the valve stem, a tube disposed within said hollow actuating stem and connected to the valve sleeve and having means shifting the valve to open position upon connection between the valve sleeve and the tube whereby to vent the interior of the tire through the tubular extension and the valve sleeve and the tube.

3. A pneumatic tire filling and draining attachment as claimed in claim 2, wherein fluid flow control means are provided on the outer end of said tube.

4. A pneumatic tire filling and draining attachment as claimed in claim 2, wherein the actuating stem includes handle means for rotating and axially shifting the same and with the tube extending through said handle means.

References Cited in the file of this patent

UNITED STATES PATENTS

| | | |
|---|---|---|
| 840,469 | Berry | Jan. 8, 1907 |
| 2,320,042 | McMahan | May 25, 1943 |
| 2,339,381 | Crowley | Jan. 18, 1944 |
| 2,347,267 | Jowers | Apr. 25, 1944 |
| 2,415,019 | McMahan | Jan. 28, 1947 |
| 2,419,146 | Kimm et al. | Apr. 15, 1947 |
| 2,488,946 | Turpin | Nov. 22, 1949 |
| 2,652,181 | Rupp | Sept. 15, 1953 |
| 2,656,083 | Blomgren | Oct. 20, 1953 |